United States Patent [19]

Petit et al.

[11] Patent Number: 4,495,080
[45] Date of Patent: Jan. 22, 1985

[54] METHOD FOR PREPARING A CATION EXCHANGER

[75] Inventors: Léon Petit, Wavre; Serge R. De La Roche, Alsemberg, both of Belgium

[73] Assignee: Société internationale de Pulicité et d'Agences commerciales, enabrégé: "Sipac", Belgium

[21] Appl. No.: 521,014

[22] Filed: Aug. 8, 1983

Related U.S. Application Data

[63] Continuation of Ser. No. 223,901, Jan. 9, 1981, abandoned.

[30] Foreign Application Priority Data

Jan. 16, 1980 [LU] Luxembourg ............................ 82089

[51] Int. Cl.³ ............................ C02F 5/02; C02B 1/44
[52] U.S. Cl. .................. 252/179; 252/174.25; 210/661; 210/663; 210/670; 210/683; 423/329; 423/331
[58] Field of Search .............. 210/660, 663, 670, 683, 210/661; 252/179, 174.25; 423/335, 334, 339, DIG. 14, 331, 329

[56] References Cited

U.S. PATENT DOCUMENTS

| | | | |
|---|---|---|---|
| 1,493,455 | 5/1924 | Kobelt | 252/179 |
| 2,213,530 | 9/1940 | Montero | 252/179 X |
| 3,206,303 | 9/1965 | Goren | 423/339 |
| 3,307,906 | 3/1967 | Burke | 423/339 |
| 3,886,079 | 5/1975 | Burke | 252/109 |
| 4,312,845 | 1/1983 | Wason | 423/339 |

FOREIGN PATENT DOCUMENTS

| | | |
|---|---|---|
| 647981 | 9/1962 | Canada . |
| 833607 | 4/1960 | United Kingdom . |
| 891170 | 3/1962 | United Kingdom . |
| 918884 | 2/1963 | United Kingdom . |
| 1050448 | 12/1966 | United Kingdom . |
| 1203950 | 9/1970 | United Kingdom . |
| 1414685 | 11/1975 | United Kingdom . |
| 1506507 | 4/1978 | United Kingdom . |
| 1516053 | 6/1978 | United Kingdom . |
| 1518024 | 7/1978 | United Kingdom . |
| 1532178 | 11/1978 | United Kingdom . |
| 1537501 | 12/1978 | United Kingdom . |

*Primary Examiner*—P. E. Willis, Jr.
*Attorney, Agent, or Firm*—Scully, Scott, Murphy & Presser

[57] ABSTRACT

There is described a method for preparing a cation exchanger to remove metals from liquids they are contained in, which comprises adding to a silicic acid medium with a molecular weight which is preferably lower than 50,000, such a base which brings said medium at least to pH 8, preferably about pH 10, and forming a precipitate that comprises said cation exchanger.

26 Claims, 4 Drawing Figures

4,495,080

METHOD FOR PREPARING A CATION EXCHANGER

This is a continuation of co-pending application Ser. No. 223,901 filed Jan. 1, 1981, now abandoned.

This invention pertains to a method for preparing a cation exchanger to remove metals from liquids they are contained in.

An essential object of this invention is to provide a method for preparing a cation exchanger which is mostly efficient for removing metal contaminants which are contained in some surface-treatment waters and which has moreover a low enough cost to avoid requiring regenerating thereof. This thus means an exchanger which is removable after saturating thereof.

Said preparation method comprises adding to a silicic acid medium with a molecular weight which is preferably lower than 50,000, such a base which brings said medium at least to pH 8, preferably about pH 10, and forming a precipitate that comprises said cation exchanger.

Advantageously said precipitate is dried and subjected to grinding to obtain preferably particles with a mean diameter from 100 to 600 microns.

In a particular embodiment of the invention, a solution from silicic acid is prepared with a pH lying between 1 and 3, and preferably a pH about 2.

In a preferred embodiment of the invention, cement is used as base to form said precipitate.

The invention has also for object the cation exchanger obtained by working the above method.

The invention further pertains to a method for extracting metals from a liquid by means of said exchanger.

Said method comprises passing said liquid through a bed formed by said exchanger.

Advantageously, the liquid is passed from bottom to top through the exchanger bed and the liquid speed through said bed is so adjusted as to bring the exchanger particles it is comprised of, into suspension to thus form a so-called "stirred" or "fluidized" bed.

Other details and features of the invention will stand out from the following description, given by way of non limitative example and with reference to the accompanying drawings, in which.

Figure 1:
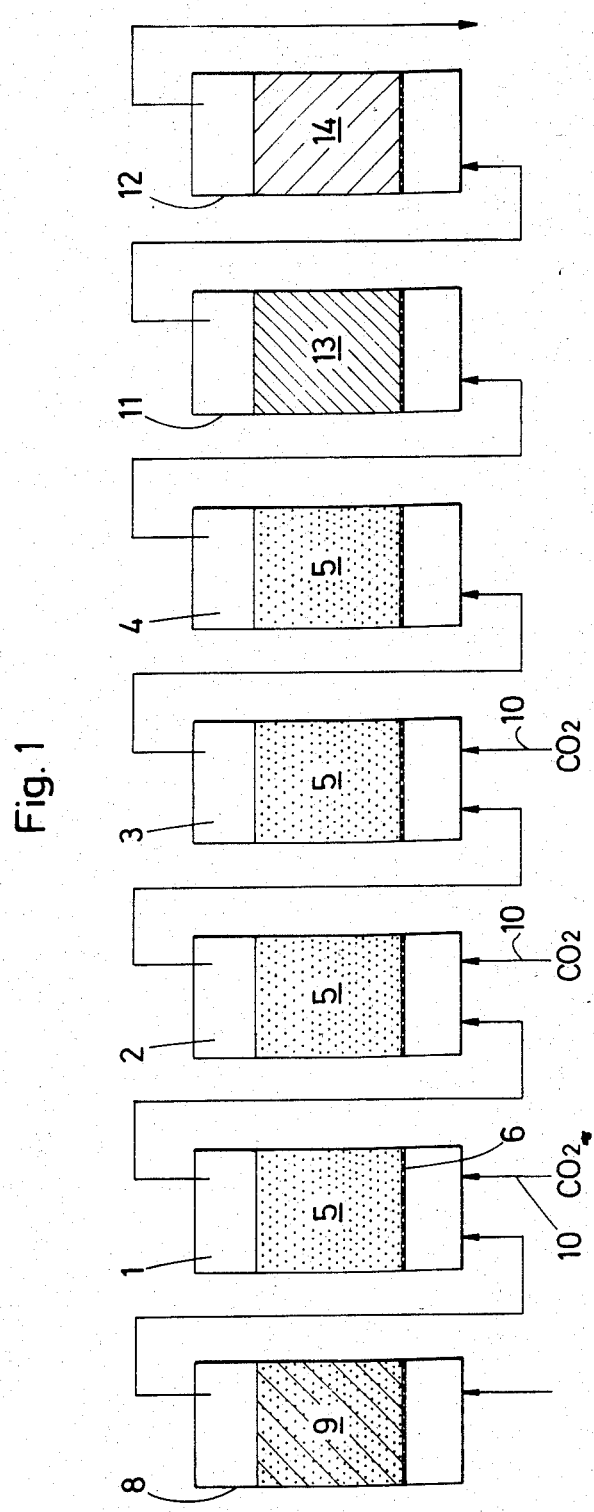
FIG. 1 is a diagrammatic showing of a particular embodiment of the method according to the invention.

The invention relates generally to a method for preparing an exchanger to be used for removing metals from liquids they are contained in by adding to a silicic acid medium, preferably a silicic sol with a molecular weight which is preferably lower than 50,000, a base bringing said medium at least to pH 8, preferably about pH 10, and thus forming a micro-spongy precipitate that comprises said cation exchanger.

Said precipitate is then dried and subjected to grinding up to obtaining particles with a mean diameter from 100 to 600 microns and preferably in the range from 200 to 400 microns.

It may be useful in some cases, to provide for a screening after the grinding operation to obtain a classification of the cation exchanger particles.

Such a method may be applied in two steps.

The first step comprises preparing a silicic sol by attacking a silicate inside a medium with a pH lying between 1 and 3, and preferably a pH in the range from 1.5 to 2.

Use is generally made therefor of a calcium, sodium and/or aluminum silicate, and preferably of a slag.

In that case where use is made of a solid silicate and to prevent forming a polymerized silica film about the silicate grains, said silicate is subjected to abrading during acid etching thereof.

On the other hand, to said silicic acid solution is preferably added a buffer, notably aluminum sulfate, to lower the solution basicity during the second step.

Said second step comprises essentially bringing said sol to the required concentration in such a way that the silicium content lies between 2 to 12.5% by weight of silicium, and preferably about 0.5% silicium, and adding a base to said solution.

It has been noticed according to the invention, that very satisfactory results have been obtained by adding cement.

Use is generally made of a cement/silica ratio from 5/1 to 30/1 and preferably in the range from 10 to 20/1.

In practice in such a preferred embodiment of the method according to the invention, said silicic soil is added to a cement suspension or putty. Thereafter, the medium may be filtered according to the viscosity. The resulting cake undergoing setting after 2 to 3 days, may be dried and then ground.

The use of cement as neutralizing agent for the acid silicic sol results in a reducing of the marked basic nature thereof.

Those particles with too fine a granulometry, resulting from the grinding, may be used again for example by compacting followed by a new grinding and screening.

In some cases, it would be possible to use as base, a mixture from cement and lime.

In such a case it is sometimes useful to add a buffer, such as aluminum sulfate as already mentioned above.

According to another variation, use is made as strong acid, of a residual acid containing metal impurities, such as those acid residues originating from titanium dioxide production.

Said acid residues contain mainly sulfuric acid (250 g/liter) and $Fe^{++}$ (19.1 g/liter), as well as many other metal elements with a low proportion.

The use of such an acid requires thus removing partly at least the iron during the synthesis of the cation exchanger.

Consequently during a first step, slag with a pH value from 1 to 1.5 is dissolved by means of said residual acid and the resulting solution is subjected to filtering for separating the calcium sulfate from the resulting silicic sol.

In a second step, the solution pH is raised to a value from 3.5 to 4.5 and preferably from 3.8 to 4, for example by slowly adding a lime slag and the final concentration of the solution is adjusted to about 5% silicium. At such a pH, silica undergoes a polymerizing reaction and is separated from the $Fe^{++}$ remaining in solution, by decanting, centrifugating or filtering.

In a third step, said polymerized silica is suspended again in water and a cement suspension is added.

In a fourth step, the solid phase is separated from the liquid phase by decanting, centrifugating or filtering and possibly drying.

As the silica was already polymerized at the time the cement is added, said resulting solid phase is preferably subjected to compacting to obtain a stable product which will not disintegrate when contacting water.

In a fifth step, the thus compacted product is subjected to grinding and screening.

Still another variation of the method according to the invention lies in using lime as base to be reacted with the silicic sol.

However, the resulting precipitate requires dewatering at a temperature from 100° to 150° C. during one day at least before being subjectable to grinding.

The, method for preparing the exchanger according to the invention will be further illustrated by the actual examples given hereinbelow.

EXAMPLE I

Starting material was 133 g from a slag with the following composition : $CaO$ 37.2%; $SiO_2$ 32.2%; $Al_2O_3$ 15.6%; $MgO$ 8.5%; $TiO_2$ 1.12%; $K_2O$ 1.2%; $Na_2O$ 0.97%; $Fe$ 0.95%.

This is a slag wherein the atomic ratio of Si to Al is about 2.

Said slag has been ground in such a way as to obtain particles with a diameter smaller than 200 microns, by means of a Humblod Wedag's grinder having a steel shell.

Said ground slag has been attacked with 105 ml $H_2SO_4$ concentrated in 1 liter to obtain a pH value between 1 and 1.5, inside a slanted container which is rotated and contains glass balls, in such a way that the abrading action of the glass balls on the slag particles did prevent forming of a polymerized silica film about the grains. The slag was completely dissolved after about 1 hour 15 minutes.

The silica concentration has then been raised to 2% Si by weight, by bringing the volume to 2% liters by adding water.

To said solution has then been added a suspension from 800 g. cement in 500 ml water and after a long enough contact time, said medium has been filtered.

After 6 to 8 days, the cake resulting from the filtering was hard enough to be ground and screened.

The exchanger thus obtained had a cement/silica ratio of 20/1 and a final silica concentration of 1.5%. The porosity was 0.8 $cm^3/g$. and the granulometry was 200–400 microns.

EXAMPLE II

The starting material was 1 liter soda silicate with the following composition: $SiO_2$ 31%; $Na_2O$ 8%. Said soda silicate solution has been added to a sulfuric acid solution required to neutralize the basicity of the soda silicate. At the end of the reaction, there was obtained a silica sol with pH 1.5 and with a $SiO_2$ concentration of 110 g/l. A cement putty was prepared by mixing 2,200 g cement with water. The silica sol was then added in 30 minutes to the cement putty. The product has been left for 8 days in moisture conditions, then it was dried, ground and screened.

EXAMPLE III

The starting material was 1 liter soda silicate with the following composition : $SiO_2$ 31%; $Na_2O$ 8%. Said soda silicate solution has been added to a sulfuric acid solution required to neutralize the basicity of the soda silicate. At the end of the reaction, a silica sol was obtained with pH 1.5 and a $SiO_2$ concentration of 110 g/l. There was then added 30 g aluminum in the form of $Al(SO_4)_3$. A cement putty was prepared by mixing 2,200 g cement with water. The silica sol has then been added in 30 minutes to the cement putty. The product has been left for 8 days under moisture conditions, then it was dried, ground and rolled.

As mentioned above, the invention further pertains to a method for using said exchanger to extract metals from a liquid.

Said method comprises extracting metal traces from a liquid by means of the above-described exchanger by passing said liquid through a bed formed by said exchanger and preferably contained within an extracting column.

To obtain on an industrial scale, optimized efficiency and extracting capacity, the liquid is passed through a plurality of series-connected columns.

However for small flow rates where the reaction efficiency is not critical, it is preferred for making the working easier, to use but a single column.

Inside said columns, the cation exchanger contained therein is renewed periodically at intervals in time and with the same frequency as the exchanger renewing, the path followed by the liquid through the columns is so changed as to always have the liquid flow first through the most-saturated exchanger and last through that exchanger which is the least saturated with ions extracted from the liquids, that is the fresh exchanger newly replaced.

Controlling the pH for each column during the treatment of liquid effluents allows determining the neutralizing action of the cation exchanger.

A substantial lowering of the pH for each column has thus been noted after treating a determined liquid volume, which thus corresponds to that moment where the column under consideration does not insure any more the complete neutralizing of the effluent.

However in such conditions, the partly-saturated column still has some reactivity and does still allow retaining a substantial amount of metal ions. This is the reason why those columns in second, third and fourth positions insure the complete purifying of a larger effluent volume.

The complementary nature of columns operated in series is thereby clear.

Such a kind of equipment is of interest not only as regards the optimized use of the neutralizing and fixation capacity of those products to be removed, but also as regards the way the metals precipitate.

Indeed when such an equipment is operating continuously, the first column becoming after draining, the last column, the acid effluent is never directly in contact with very basic fresh exchanger, but it is to the contrary, neutralized progressively as far as it advances through the various columns.

In FIG. 1 has been shown diagrammatically an equipment comprising four columns 1, 2, 3 and 4 which are mounted in series, each column containing a determined amount of exchanger 5 retained above a pervious wall 6 which lets the liquid effluent flow through but retains the particles from the cation exchanger.

Figure 2:
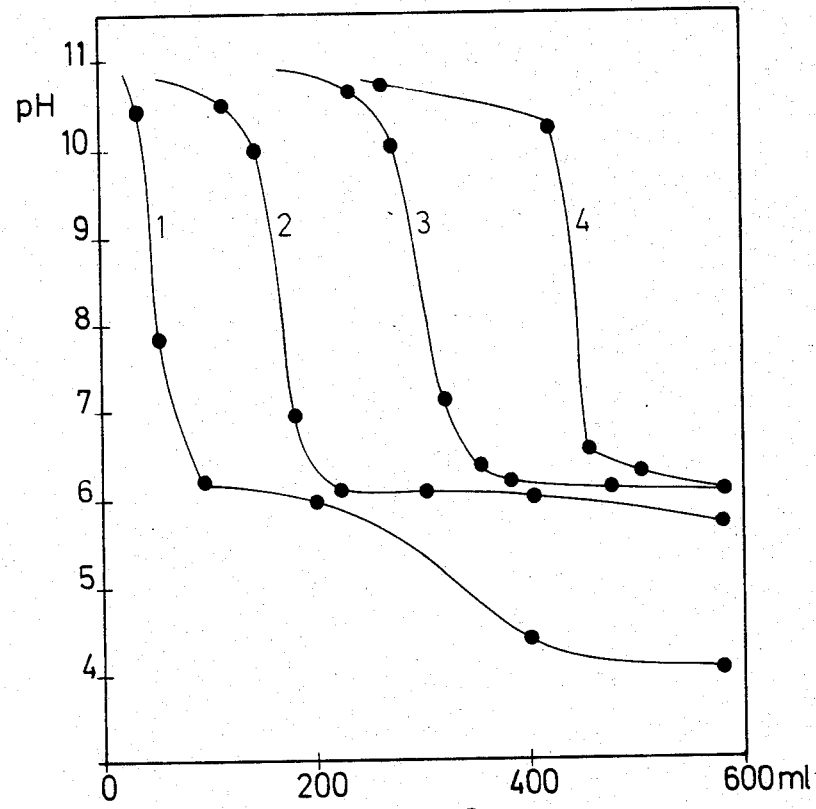
FIG. 2 shows with diagrams, the pH variation of the effluent according to that volume treated by a cation exchanger according to the invention.

FIG. 2 shows the variation of the pH value of the effluent at the outlet from the first column 1, second column 2, third column 3 and fourth column 4 relative to the volume treated, the exchanger being used having a ratio $CaO/SiO_2 = 3$.

Figure 3:
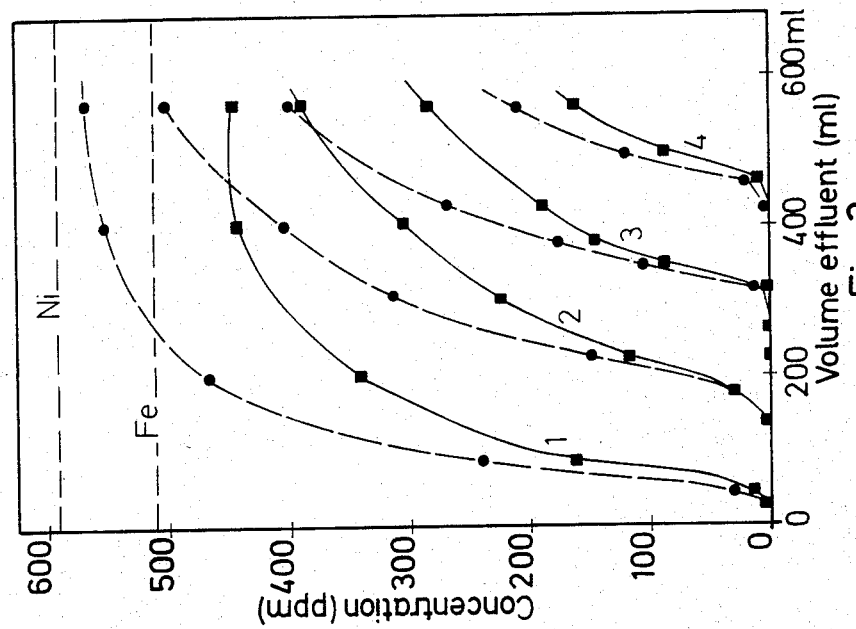
FIG. 3 shows with diagrams, the variation of the $Fe^{++}$ and $Ni^{++}$ concentration according to that volume treated by a cation exchanger according to the invention.

FIG. 3 shows the variation relative to the volume of effluent treated, of the proportion of $Ni^{++}$ and $Fe^{++}$ of the effluent at the outlet from the first column (1), second column (2), and third column (3) for an exchanger with a ratio $CaO/SiO_2 = 3$. This curve thus shows actually that a column which does not provide a complete purifying any more, still has a valuable activity.

Figure 4:
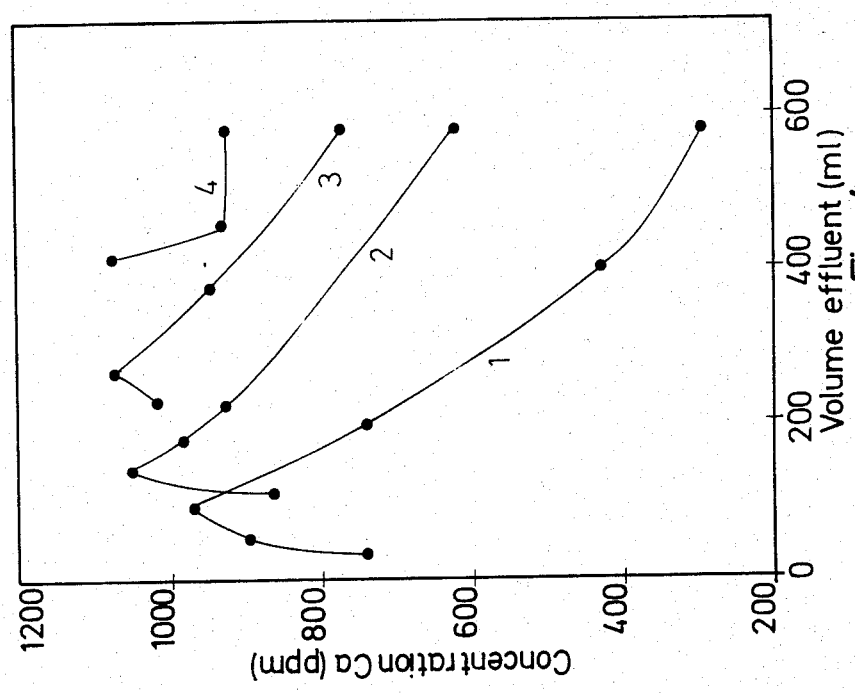
FIG. 4 shows with diagrams, the variation of the calcium content from the effluent according to the volume of treated effluent.

The curves shown in FIG. 4 show the variation of the calcium proportion in the effluent at the outlet from each column, relative to the volume of effluent treated. Comparing this figure with FIGS. 2 and 3 shows that the release peak for the calcium corresponds for each column to the maximum efficiency step for metal fixation. Moreover it is to be noticed that after purifying 600 ml effluent, the first column which was previously saturated, still releases calcium which corroborates the retaining of some activity.

The proportion in sulfate anions of the effluents at the outlet from the last column, as determined by graphimetric metering, lies between 0.5 and 0.8 g per liter; taking into account the calcium proportion, such a concentration corresponds to the solubility of calcium sulfate.

The total capacity of the exchanger in each column has been reckoned by considering the continuous working of the columns and does correspond to the volume of purified effluent. It is measured by the staggering along the x-axis of those curves pertaining to the third and fourth columns.

In said extracting columns 1 to 4, the liquid is passed from bottom to top through the exchanger bed 5 and the liquid flow rate through said bed is so adjusted as to bring the exchanger particles it is comprised of, into suspension by thus forming a so-called "stirred" or "fluidized" bed.

This thus insures a maximized contact between the liquid and the cation exchanger particles.

In that case where the liquids do contain $Cr^{6+}$, the liquid is first passed through a column 8 which contains solid iron particles 9, notably iron filings, to reduce $Cr^{6+}$ to $Cr^{+++}$, before passing said liquid through adsorbent 5.

Indeed, the ion $CrO_4^{--}$ is soluble within the whole pH range; on the other hand the trivalent chrome does already precipitate in acid medium with a pH about 3.

To lower the basicity and prevent precipitating of the hydroxide outside the cation exchanger grains, a neutralizing agent is preferably brought in the presence of bed 5.

In practice, this may be made by passing through the liquid inside columns 1 to 4, a $CO_2$ stream as shown by arrows 10 to form on the exchanger a carbonate film allowing to fix $Fe^{++}$ and thus neutralize the liquid.

Another solution lies in adding calcium carbonate particles to the cation exchanger bed.

Moreover after passing through the last column 4, the effluent is purified but might have too high a hardness, in such a way that it might be of interest to soften the purified effluent. This is the reason why the column 4 is followed by two additional columns 11 and which are also mounted in series. Column 11 contains an organic cation exchanger 13 while column 12 contains for example an organic anion exchanger 14.

The method according to the invention is advantageously applied to purifying liquids for the surface treatment of metals, such as rinsing liquids which contain metal ions to be removed.

An actual example will be given hereinafter for the purifying of a rinsing water polluted with ions $CrO_4^{--}$, by means of the exchanger according to the invention.

It does pertain to a rinsing water containing 8 m/liter $CrO_3$ and 236 mg/liter $H_2SO_4$. Said water has been fed at a flow rate of 100 l/hour to a cation exchanger bed.

The equipment did comprise a series of two columns, the first column containing iron filings, the second column the cation exchanger.

The water leaving the second column, that is after purifying, had the following composition:

| | |
|---|---|
| $Cr^{+++}$ | untraceable |
| $Ca^{++} - Mg^{++}$ | 120 ppm |
| Na | 1 ppm |
| K | 5 ppm |
| pH | 7-8 |
| $Fe^{++}$ | untraceable |

The hardness of the purified water was 30° F.

The hardness of the purified water was 30° F. while the hardness from the local main water was 44° F. It was thus advantageous to soften said purified water before recycling thereof.

The untraceable chromium porportion and the pH neutrality confirm the efficiency of the method according to the invention.

An exchanger according to the invention with a ratio cement/silica of 20/1, a porosity of 0.8 $cm^3/g$ and a granulometry of 200–400 microns has been tested inside a column. The pH value from the resulting effluent has been raised to 11. A complete lack of hydroxide mud has been noted.

The capacity of such an exchanger was 6 milliequivalents/g; it does correspond to a concentration factor lying between 50 and 60 and a metal fixation equal to 20% of the cation exchanger weight.

Those particles with too fine a granulometry which have been subjected to a high pressure followed by grinding and screening give an equivalent capacity. This allows to conclude that the fine granulometry compensates for the loss of porosity of the cation exchanger.

As a rule there is noted an increase in the capacity of one and the same exchanger when making use of a finer granulometry. This does result among others from the metal precipitating as films on the surface of the cation exchanger grains.

On the other hand, those exchangers with a lower lime proportion have a higher capacity, probably due to the larger specific area and higher porosity thereof.

The volume of the fluidized exchanger bed is another parameter of great importance as it does determine the size of the equipment.

It is noted that an exchanger with a ratio $CaO/SiO_2 = 3$ results in the fluidized bed volume reaching a minimum value of 1.5 $cm^3/g$. When the diameter increases, it is required to increase the flow rate to insure a good fluidizing of said bed.

The column treatment of acid effluents with a pH about 2 containing for instance 0.5 liter $Ni^{++}$ and 0.5 g/liter Fe++ allows a polluting agent proportion in the liquid to be purified with a factor from 10 to 40 according to the texture of the exchanger being used.

It must be understood that the invention is in no way limited to the above embodiments and that many changes may be brought threin without departing from the scope of the invention as defined by the appended claims.

I claim:
1. A method of preparing a cation exchanger for removing metals from metal-containing liquids, which comprises:
    (a) preparing a silicic acid solution having a molecular weight lower than 50,000 at a pH value between 1 and 3;
    (b) adding to said silicic acid solution an amount of cement to form a micro-spongy precipitate having a $CaO/SiO_2$ ratio between 1 and 3.5; and
    (c) drying and grinding said precipitate to form particles with a mean diameter of from 100 to about 600 microns.
2. A method of preparing a cation exchanger for removing metals from metal-containing liquids, as recited in claim 1, wherein the means diameter is from about 200 to about 400 microns.
3. A method of preparing a cation exchanger for removing metals from metal-containing liquids, as recited in claim 1, which further comprises compacting said precipitate before grinding.
4. A method of preparing a cation exchanger for removing metals from metal-containing liquids, as recited in claim 1, which further comprises screening the ground precipitate.
5. A method of preparing a cation exchanger for removing metals from metal-containing liquids, as recited in claim 1, wherein the pH value is about 2.
6. A method of preparing a cation exchanger for removing metals from metal-containing liquids, as recited in claim 1, wherein the silicium proportion in the silicic acid solution of step (a) is between 0.2 and 12.5 by weight.
7. A method of preparing a cation exchanger for removing metals from metal-containing liquids, as recited in claim 1, wherein the silicium proportion is about 0.5% by weight.
8. A method of preparing a cation exchanger for removing metals from metal-containing liquids, as recited in claim 1, wherein the preparing step comprises treating a silicate or a slag with a strong acid.
9. A method of preparing a cation exchanger for removing metals from metal-containing liquids, as recited in claim 8, wherein the silicate is calcium, sodium and/or aluminum silicate.
10. A method of preparing a cation exchanger for removing metals from metal-containing liquids, as recited in claim 8, wherein the slag contains mainly CaO, $SiO_2$ and $Al_2O_3$.
11. A method of preparing a cation exchanger for removing metals from metal-containing liquids, as recited in claim 8, wherein the strong acid is sulfuric acid.
12. A method of preparing a cation exchanger for removing metals from metal-containing liquids, as recited in claim 1, wherein the preparing step comprises abrading a solid silicate while treating said silicate with a strong acid so as to prevent a polymerized silica or gypsum film from forming about the silicate grains.
13. A method of preparing a cation exchanger for removing metals from metal-containing liquids, as recited in claim 12, wherein the solid silicate is calcium, sodium and/or aluminum silicate or a slag containing mainly CaO, $SiO_2$ and $Al_2O_3$.
14. A method of preparing a cation exchanger for removing metals from metal-containing liquids, as recited in claim 12, wherein the strong acid employed during the preparation step is sulfuric acid.
15. A method of preparing a cation exchanger for removing metals from metal-containing liquids, as recited in claim 1, wherein the preparing step comprises:
    (a) treating a silicate or a slag containing silica with an acid residue from titanium dioxide production to form a solution;
    (b) raising the pH value of the solution to between 3.5 and 4.5 so as to polymerize the silica in the solution;
    (c) separating the polymerized silica from the metal contaminants remaining in solution; and
    (d) suspnding the separated polymerized silica in an aqueous solution.
16. A method of preparing a cation exchanger for removing metals from metal-containing liquids, as recited in claim 15, wherein the silicate is calcium, sodium and/or aluminum silicate.
17. A method of preparing a cation exchanger for removing metals from metal-containing liquids, as recited in claim 15, wherein the slag contains mainly CaO, $SiO_2$ and $Al_2O_3$.
18. A method of preparing a cation exchanger for removing metals from metal-containing liquids, as recited in claim 15, wherein the acid residue contains sulfuric acid and Fe++.
19. A method of preparing a cation exchanger for removing metals from metal-containing liquids, as recited in claim 14, wherein the pH value during the preparation step is between 3.8 and 4.
20. A method of preparing a cation exchanger for removing metals from metal-containing liquids, as recited in claim 1, wherein the pH of the silicic acid solution of step (b) is about 10.
21. A method of preparing a cation exchanger for removing metals from metal-containing liquids, as recited in claim 1, wherein the cement is in the form of a suspension or putty.
22. A method of preparing a cation exchanger for removing metals from metal-containing liquids, as recited in claim 20, wherein the cement/silica ratio is from about 5/1 to about 30/1.
23. A method of preparing a cation exchanger for removing metals from metal-containing liquids, as recited in claim 21, wherein the cement/silica ratio is from about 10/1 to about 20/1.
24. A method of preparing a cation exchanger for removing metals from metal-containing liquids, as recited in claim 23, which further comprises dewatering the precipitate.
25. A method of preparing a cation exchanger for removing metals from metal-containing liquids, as recited in claim 1, which further comprises adding aluminum sulfate as a buffer to the silicic acid solution of step (b) and separating the gypsum formed.
26. A cation exchanger obtained by the method of claim 1.

* * * * *

UNITED STATES PATENT AND TRADEMARK OFFICE
CERTIFICATE OF CORRECTION

PATENT NO. : 4,495,080
DATED : January 22, 1985
INVENTOR(S) : Leon Petit, et al

It is certified that error appears in the above-identified patent and that said Letters Patent is hereby corrected as shown below:

Column 2, Line 32, delete "soil" and insert therefor --sol--.

Column 3, Line 44, delete "2%" and insert therefor --2--.

Column 6, Line 32, delete "porportion" and insert therefor --proportion--.

Column 6, Line 68, delete "liter" and insert therefor --g/liter--.

Column 7, Line 6, delete "threin" and insert therefor --therein--.

Column 8, Line 16, delete "production".

Column 8, Line 22, delete "suspnding" and insert therefor --suspending--.

Signed and Sealed this

Eighth Day of October 1985

[SEAL]

Attest:

Attesting Officer

DONALD J. QUIGG

Commissioner of Patents and
Trademarks—Designate